United States Patent Office 3,289,078
Patented Nov. 29, 1966

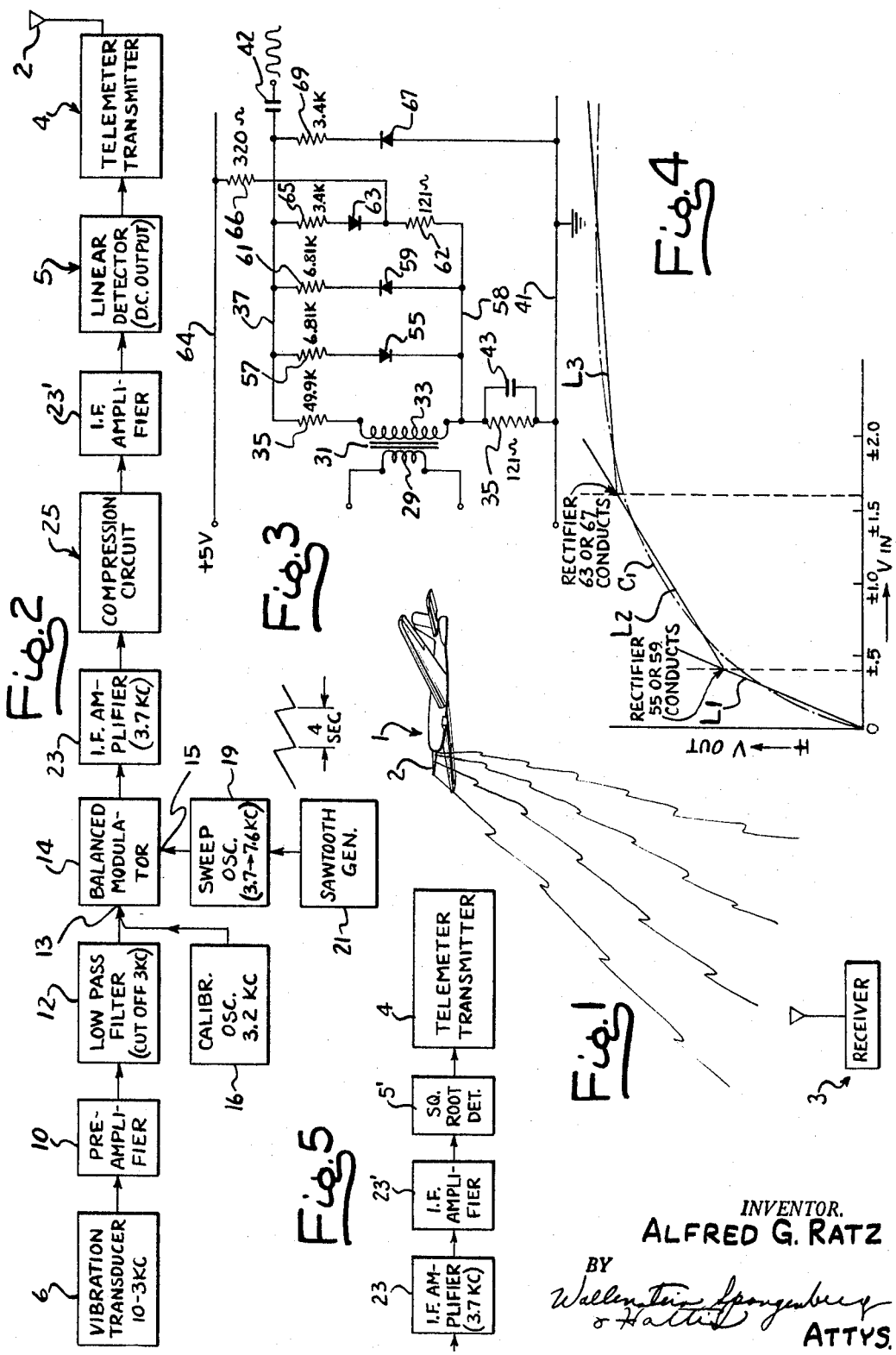

3,289,078
SPECTRUM ANALYZER WITH SIGNAL COMPRESSION MEANS IN A TELEMETRY SYSTEM
Alfred G. Ratz, Trenton, N.J., assignor to Gulton Industries, Inc., Metuchen, N.J., a corporation of New Jersey
Filed June 28, 1961, Ser. No. 120,415
2 Claims. (Cl. 324—77)

The present invention relates to telemetry equipment which has its most important application in airborne vehicles, such as missiles, satellites and the like. More particularly the invention relates to the telemetering of information on the magnitude of variables, such as vibration acoustic variables, having an extremely wide dynamic range.

Vibration characteristics of missiles, satellites and the like are exceedingly important parameters in evaluating the operating performance of these vehicles. At one time, the telemetry equipment carried by these vehicles transmitted signals modulated at the vibration frequencies which required extremely wide band telemetry equipment since the component vibration frequencies frequently extend to very high limits. However, the actual information usually desired from these vibration variables is contained in their statistical properties, such as their spectral density, which vary at a relatively slow rate and which, if transmitted in the first instance by the telemetry equipment, would require a relatively narrow bandwidth. This bandwidth inefficiency can obviously be eliminated by using small, lightweight airborne frequency spectrum analyzers which examine contiguous narrow frequency bands of the vibration variables and transmit information on the relative spectral density values in these bands. However, a very difficult problem still exists in that the telemetry equipment must still handle input signals whose amplitude level varies over extremely wide limits.

One form of spectrum analyzer of particular value for airborne applications is the swept type of spectrum analyzer because of its size and weight advantages. This adaptability to airborne use in enhanced by the fact that it supplies data to the telemeter in serial fashion. The swept type of spectrum analyzer includes a local oscillator whose frequency is progressively periodically varied at a linear rate between lower and upper limits, and a modulator circuit which provides a beat frequency output between the swept local oscillator and the vibration signals being analyzed. A relatively narrow band intermediate frequency (IF) amplifier section is connected to the output of the modulator so that the beat frequencies amplified by the IF amplifier represent the spectral density of progressively scanned narrow frequency bands of the vibration variable being scanned. The average amplitude of the IF signal is proportional to the spectral density of the frequency band of the vibration signal being scanned at any instant. The output of the IF amplifier section is fed to a detector which converts the IF signal to a varying amplitude direct current (D.C.) voltage.

The spectrum analyzers heretofore used for the purposes explained above did not effectively handle the wide dynamic range of the vibration signals. For example, where the equipment was sensitive to low level signals, the high levels signals would frequently overdrive the spectrum analyzer or telemeter transmitter equipment. Accordingly, one of the main objects of the present invention is to provide a spectrum analyzer useful in conjunction with conventional telemeter transmitters where the overall system is capable of handling vibration or other signals having an extremely wide dynamic range. A related object of the invention is to provide a spectrum analyzer or similar equipment for handling signals of an extremely wide dynamic range which is simple, reliable, and easy to adjust and maintain.

In accordance with one aspect of the present invention, a square root, logarithmic or a similar compression function is introduced into the telemetering system ahead of the telemeter transmitter. Thus, for example, a square root or logarithmic function generator could be connected between the output of the spectrum analyzer and the input of the telemeter transmitter. Output compression function generators heretofore used for different applications comprise a series of D.C. amplifiers having different amplification levels and amplifier control means which switch in different amplifiers when the input D.C. voltage reaches different levels to a simulate a square root or logarithmic function. However, such a compression function generator is not very practical for airborne use because of size and weight considerations. More importantly, it is difficult to design a square root or logarithmic function generator utilizing D.C. amplifiers which do not drift and which can handle low level signals effectively.

In accordance with a specific aspect of the present invention, to overcome the problems of the aforesaid D.C. function generator, a square root rather than a linear or square law detector is used in the spectrum analyzer, such detector simultaneously introducing a square root function and converting the intermediate frequency signals to a varying amplitude D.C. signal for feeding to the telemeter transmitter. It has been discovered that the use of a square root detector, in addition to the advantages of compressing the dynamic range of the telemeter transmitter input signals, also reduces what is known as ripple error which arises due to the beating of noise frequency components. Another source of error in telemetry systems using swept spectrum analyzers which is reduced by the use of a square root detector is sometimes referred to as bandwidth error. This source of error is aggravated by the presence of resonant peaks in the vibration spectrum being analyzed.

Substantially improved results over the use of a square root detector are obtained when the most preferred form of the invention is used. In this form of the invention a linear detector is used and the compression function is introduced ahead of the last IF amplifier stage, and most advantageously after the first IF amplifier stage. In such case, the function generator must operate on both positive as well as negative going portions of the (A.C.) intermediate frequency signal, to maintain the integrity of the IF signal amplified by the IF amplifier stage or stages following the function generator circuit. The placement of the compression function generator at this point has a number of advantages, one of which is the fact that the function generator operates on lower amplitude signals which minimizes the possibility of overdrive of the following IF amplifier stage or stages and otherwise simplifies the problem of designing accurate function generators. For example, the function generator can use inexpensive, reliable and compact semi-conductor rectifiers at low signal levels.

Other features of the invention include the design details of the function generator per se.

Other objects, features and advantages of the present invention will become apparent upon making reference to the specification to follow, the claims and the drawings wherein:

FIG. 1 illustrates the environment in which the present invention finds its most useful application, namely in telemeter systems for airborne vehicles;

FIG. 2 is a simplified box diagram of the most preferred form of the present invention;

FIG. 3 is a circuit diagram of the square root function generator circuit forming part of the system shown in FIG. 2;

FIG. 4 is a diagram illustrating the manner in which the function generator circuit operates; and FIG. 5 is a fragmentary box diagram of a less preferred form of the present invention.

As previously indicated, the most important application of the present invention is in the telemetering of information on vibration and acoustical variables in airborne vehicles. As shown in FIG. 1, a drone plane 1 has an antenna 2 which transmits radio signals which are pulse time, pulse width or otherwise modulated so as to carry the data information to be transmitted to a remote ground station 3. The telemetry equipment to be described is carried in the drone plane 1 and operates in conjunction with a telemeter transmitter 4 energizing the antenna 2 (FIG. 2).

The telemeter transmitter 4 may be a standard telemeter transmitter whose input is a variable amplitude direct current voltage fed from the output of a detector 5. The instantaneous amplitude of the varying amplitude direct current voltage fed from the detector 5 indicates the value of the parameter being telemetered, in the exemplary form of the invention the spectral density plot of the vibration or acoustic spectrum detected by one or more vibrations or sound pick-up transducers 6. The spectral density variable normally varies at a relatively slow rate for reasons to be explained. Vibration frequencies of interest normally fall in the range of from approximately 0 to 3 kilocycles.

The output of the transducer or transducers 6 is fed to a suitable preamplifier 10 which amplifies the output of the transducers. The output of the preamplifier is fed to a low pass filter circuit 12 which filters out frequencies above the range of interest, namely above 3 kilocycles in the example being considered. The output of the low pass filter is fed to an input 13 of a conventional balanced modulator circuit 14 which produces in the output thereof the sum and difference frequencies of the signals fed to two inputs thereof and substantially suppresses the carrier frequencies. The output of a calibration oscillator 16 operating at an exemplary frequency of 3.2 kilocycles is also fed to the input 13 of the balanced modulator circuit 14. The exact frequency of the calibration oscillator is unimportant. It is a frequency above the cutoff frequency of the filter circuit 12 and within a frequency range to produce a marker signal falling within the bandwith of an IF amplifier system to be described.

The balanced modulator 14 has a second input 15 fed from a swept oscillator 19 which provides an output frequency which progressively and linearly increases from a minimum frequency to a maximum frequency in a periodic manner. The swept oscillator may be a multivibrator circuit whose frequency is controlled by the output of a saw-tooth generator 21 which produces a slowly varying saw-tooth output which progressively advances the triggering point of the multivibrator oscillator. The period of the saw-tooth generator output may be, for example, three to four seconds. In the exemplary form of the invention being described, the low frequency point of the swept oscillator output will be assumed to be 3.7 kilocycles and the upper point 7.7 kilocycles. With vibration signals of from 0 to 3 kilocycles, the 3.7 to 6.7 kilocycles portion of the output of the swept oscillator 19 can provide an intermediate or difference frequency of 3.7 kilocycles in the output of the modulator circuit.

Accordingly, one or more intermediate frequency amplifier stages 23–23' are coupled to the output of the balanced output modulator circuit 14, the intermediate frequency amplifier stages being relatively narrow band amplifiers operating at a center frequency of 3.7 kilocycles, the bandwidth being only a small fraction of the vibration spectrum of from 0 to 3 kilocycles. It is thus apparent that the varying average value of the signals amplified in the intermediate frequency amplifier stage 23 during each three or four second interval of the saw-tooth generator 21 will represent the spectral density plot of the vibration spectrum. In effect, the vibration spectrum is scanned during each cycle of the saw-tooth generator 21.

The calibration oscillator 16 provides a 3.7 kilocycle marker signal in the intermediate frequency amplifier stages 23–23' when the sweep oscillator is approximately at a frequency of 6.9 kilocycles. This marker signal marks a frequency of 3.2 kilocycles on the spectral density plot of the vibration data indicated by the signals received by the ground station 3.

Another marker signal appears in the spectral density plot due to feed through to the IF amplifier of a relatively small but detectable 3.7 kilocycle signal from the sweep oscillator 19. Most conventional balanced modulator circuits can be adjusted to feed through a detectable carrier signal at one or more of its inputs. The sweep oscillator has a frequency of 3.7 kilocycles at the beginning of each sweep cycle. Normally, there are little or no vibration signals at or near zero frequency so that a regular signal appearing near the low frequency end of the spectral density plot is the zero frequency marker signal. Since the sweep oscillator varies at a linear rate, the entire frequency scale can be determined from the two marker signals.

In accordance with the most preferred form of the present invention, a compression circuit 25 is inserted after the first IF amplifier stage 23. The compression circuit 25 preferably acts as a square root or logrithmic function generator which provides a compressed output-input characteristic like the curve C1 shown in FIG. 4 which represents a square root function. The compression circuit 25 provides the same compression characteristic for both positive and negative going portions of the IF signal fed thereto from the IF amplifier stage 23. In accordance with the preferred aspect of the invention now being described, the compression circuit 25 could be placed ahead of the amplifier stage 23. In any event, it is highly desirable that the compression circuit 25 be placed in a low signal level portion of the IF amplifier section of the spectrum analyzer. (Nevertheless, the broader aspects of the invention contemplates placing the compression circuit at the output of the last IF amplifier stage 23' or incorporating the same in the detector 5. FIG. 5, for example, shows a square root detector 5' taking the place of the compression circuit 25 and the linear detector 5 in FIG. 2.) The placement of the compression circuit in the low level portion of the IF amplifier section of the spectrum analyzer minimizes the possibility of overdriving the amplifier stages following the compression circuit. Also, simplicity and reliability of the compression circuit design is facilitated by the presence of low level signals.

As previously indicated, the introduction of a compression function, such as a square root function, in addition to increasing the dynamic range of the telemetering system also reduces ripple and bandwidth error. This is true whether the compression circuit is a separate stage ahead of the detector 5 or is formed by the detector itself.

Reference should now be made to FIG. 3 which illustrates a preferred form of compression circuit 25. As there shown, the output of the IF ampifier stage 23' feeds the primary winding 29 of a transformer 31. The transformer 31 has a secondary winding 33 whose upper end is connected through a resistor 35 to a common output line 37. The bottom end of the secondary winding 33 is connected through a back bias forming resistor 39 to a ground line 41. An IF frequency bypass capacitor 43 is connected in parallel with the resistor 39 so that the bottom end of the secondary winding 33 is effectively at ground potential with respect to IF signals.

The output line 37 is coupled by a capacitor 42 to the input of the linear detector 5 which is assumed to have a relatively high input impedance relative to the resistor 35. For signals in the low range of values to be handled by the compression circuit, substantially all of the signal voltage induced in the secondary winding 33 is coupled to the input of the linear detector 5. The load line for the compression circuit output-input characteristic for signals in this low range is shown by line L1 in FIG. 4. This line L1 falls near the lowest segment of the square root curve C1. A number of branch circuits are connected in parallel with the output of the compression circuit progressively to change the resultant impedance across the output of the compression circuit at different signal levels to form an output-input characteristic approximating the square root function for both positive and negative going portions of the input signal. One of these branch circuits includes a semi-conductor rectifier 55 and a resistor 57 connected between the common output line 37 and a common line 58 extending to the bottom end of the secondary winding 33. Exemplary values for resistor 57 and the other resistors of the compression circuit are shown in FIG. 4. In this exemplary circuit, when the upper end of the secondary winding 33 is approximately 0.4 of a volt positive with respect to the bottom end thereof, the rectifier 55 will begin to conduct effectively to reduce the output impedance and compress the output by an amount determined by the relative values of resistors 57 and 35. The effective load line of the circuit when the rectifier 55 conducts is shown by line L2 in FIG. 4. The line L2 joins the load line L1 at a point slightly above the square root curve C1 and is selected to follow fairly closely the next narrow segment of the curve C1.

A second branch circuit comprising a semi-conductor rectifier 59 inverted with respect to rectifier 55 and a resistor 61 of the same value as resistor 57 is connected across the lines 37 and 58, the rectifier 55 becoming conductive to provide a load line 12 when the upper end of the secondary winding 32 is 0.4 volt negative with respect to the bottom end thereof.

A third branch circuit is provided comprising a back bias forming resistor 62 of the same magnitude as resistor 35, a semi-conductor rectifier 63 and a resistor 65 extending between the lines 37 and 58. A resistor 66 is connected between the juncture of rectifier 63 and resistor 62, on the one hand, and a line 64 which is at a potential of 5 volts positive with respect to ground, on the other hand. The resistors 35, 62 and 66 form a voltage divider network which provides a back bias on the rectifier 63 which prevents conduction thereof until the upper end of the secondary winding 33 is approximately 1.6 volts positive with respect to the bottom end thereof. Conduction of this rectifier provides an output impedance determined by the parallel impedance value of resistors 65 and 57 to provide an effective load line L3 of a smaller magnitude than load lines L1 and L2, further to compress the output-input characteristic. The load line L3 is selected so that it follows fairly closely a third segment of the curve C1.

A fourth branch circuit comprising a semi-conductor rectifier 67 inverted with respect to rectifier 63 and a resistor 69 of the same magnitude as resistor 65 is connected across the lines 37 and 41 and forms the counterpart of the branch circuit just described when the voltage at the upper end of the secondary winding 33 is about 1.6 volts negative with respect to the bottom end thereof. The connection of the anode electrode of rectifier 67 to the ground line 41 effectively provides a back bias for rectifier 67 equal to the direct current voltage drop across resistor 35, which is of the same magnitude as the direct current voltage drop across the resistor 62 applied as a bias to rectifier 63. It is apparent that by adding additional branch circuits and inserting suitable biasing potentials thereto that the compression circuit can more closely approximate the square root curve C1 by decreasing the width of the segments between adjacent load lines.

It should be understood that numerous modifications may be made of the preferred form of the invention described above without deviating from the broader aspects thereof.

What I claim as new and desire to protect by Letters Patent of the United States is:

1. In combination with a wireless airborne telemeter transmitter for transmitting data information modulated in accordance with the instantaneous amplitude of a direct current input signal fed thereto, and a source of alternating current data signals having a relatively wide amplitude range, an amplifying system connected between said source of data signals and said telemeter transmitter including: a substantially non-frequency-responsive compression circuit comprising first impedance means in series with said source of data signals, a number of parallel branch circuits connected in series with said source of data signals and said first impedance means, an output circuit coupled across said parallel branch circuits, said parallel branch circuits comprising a first group of branch circuits having impedance means and means for rendering the branch circuits conductive at different amplitude levels of the data signal of a first polarity, to provide a compression characteristic at the higher amplitude level, a second group of branch circuits having respective impedance means and means for rendering the branch circuits conductive at said different amplitude levels of the data signal when of an opposite polarity, to provide a symmetrical progressive compression characteristic for the positive and negative going portions of the data signal, alternating current amplifier means for amplifying the output of said compression circuit, and detector means coupled to the output of said amplifier means compression circuit for providing a varying amplitude direct current output proportional to the amplitude of the compressed alternating current signal fed thereto.

2. In combination with a wireless airborne telemeter transmitter for transmitting data information modulated in accordance with the instantaneous amplitude of a direct current input signal fed thereto, and a source of alternating current data signals having a relatively wide amplitude range, an amplifying system connected between said source of data signals and said telemeter transmitter including: a substantially non-frequency-responsive compression circuit comprising first impedance means in series with said source of data signals, a number of parallel branch circuits connected in series with said source of data signals and said first impedance means, an output circuit coupled across said parallel branch circuits, said parallel branch circuits comprising a first group of branch circuits having impedance means and means for rendering the branch circuits conductive at different amplitude levels of the data signal of a first polarity, to provide a square root compression characteristic at the higher amplitude level, a second group of branch circuits having respective impedance means and means for rendering the branch circuits conductive at said different amplitude levels of the data signal when of an opposite polarity, to provide a symmetrical progressive compression characteristic for positive and negative going portions of the data signal, alternating current amplifier means for amplifying the output of said compression circuit, and linear detector means coupled to the output of said amplifier means compression circuit for providing a varying amplitude direct current output proportional to the amplitude of the compressed alternating current signal fed thereto, and means for coupling the output of said detector means to the input of said telemeter transmitter to modulate the same in accordance with said output.

References Cited by the Examiner

UNITED STATES PATENTS

| | | | |
|---|---|---|---|
| 2,273,193 | 2/1942 | Heising. | |
| 2,403,982 | 7/1946 | Koenig | 324—77 X |
| 2,419,852 | 4/1947 | Owen | 340—178 |
| 2,492,062 | 12/1949 | Potter | 324—77 X |
| 2,581,124 | 1/1952 | Moe | 323—74 |
| 2,661,419 | 12/1953 | Tongue | 324—77 X |
| 2,760,008 | 8/1956 | Schade | 328—142 |
| 2,996,667 | 8/1961 | Galbreath | 324—77 |

OTHER REFERENCES

"RF Spectrum Analyzer," Sulzer, Tele-Tech, pp. 30, 31, July 1949.

WALTER L. CARLSON, *Primary Examiner.*

THOMAS B. HABECKER, *Examiner.*

A. E. RICHMOND, *Assistant Examiner.*